United States Patent [19]

Kobayashi

[11] Patent Number: 4,775,974
[45] Date of Patent: Oct. 4, 1988

[54] MULTIPOINT SATELLITE PACKET COMMUNICATION SYSTEM

[75] Inventor: Kazutomo Kobayashi, Tokyo, Japan

[73] Assignee: NEC Corporation, Tokyo, Japan

[21] Appl. No.: 65,852

[22] Filed: Jun. 24, 1987

[30] Foreign Application Priority Data

Jun. 26, 1986 [JP] Japan .................................. 61-150811

[51] Int. Cl.⁴ .............................................. H04J 3/16
[52] U.S. Cl. ..................................... 370/104; 370/94; 370/95
[58] Field of Search ........................... 370/104, 94, 95; 455/12; 375/3

[56] References Cited

U.S. PATENT DOCUMENTS 4,090,036  5/1978  Stott et al. ............................. 455/12
4,625,308  11/1986  Kim et al. ............................. 370/104

Primary Examiner—Douglas W. Olms
Assistant Examiner—Min Jung
Attorney, Agent, or Firm—Foley & Lardner, Schwartz, Jeffery, Schwaab, Mack, Blumenthal & Evans

[57] ABSTRACT

In response to call requests from a source data terminal, a source earth station establishes first logical channels between it and the source data terminal and establishes logical links from the first logical channels to destination earth stations via a communications satellite. The destination earth stations establish second logical channels from the logical links to the destination data terminals. Each earth station performs flow control on each of the respective logical channels on a per message unit basis and performs flow control on each of the logical links on the basis of per plural consecutive message units to provide high throughput on the satellite channel.

6 Claims, 6 Drawing Sheets

MULTIPOINT SATELLITE PACKET COMMUNICATION SYSTEM

BACKGROUND OF THE INVENTION

The present invention relates generally to data communication, and more specifically to a satellite packet communication system.

In terrestrial data communication systems, a special protocol, such as basic mode control procedure, is employed at opposite ends of a link to ensure a high degree of reliability of transmission. The basics of the protocol require the receiving end of the link to return an acknowledgement whenever it receives a message and require the transmitting end to await the receipt of the acknowledgement prior to the transmission of a subsequent message. If the acknowledgement is not received, the receiving end requests the transmitting end to retransmit a copy of the previous data unit. If a satellite channel is used in a data communication system, however, the inherent up-and-down propagation delay of the satellite channel would severely reduce the throughput of the system. One approach would be to interpose a satellite delay compensation unit (SDCU) between a data terminal equipment and one end of a satellite channel. The satellite delay compensation unit returns an acknowledgement to the data terminal equipment whenever it receives a message according to a conventional protocol and allows consecutive transmission of message packets to a destination satellite delay compensation unit over the satellite channel and ceases transmission for a period known as "window" to await reception of acknowledgements. While this "window" procedure is efficient for network throughput, the multiple access and broadcast capability of the satellite channel is not utilized effectively because it is used as a preassigned, dedicated circuit.

On the other hand, Advanced Research Projects Agency Network (ARPANET) employs a satellite channel as a part of the network. To take advantage of the multiple access, broadcast capability of the satellite, each earth station examines the address of received messages and processes those addressed to it. Two alternative methods are employed to ensure transmission reliability. One is to control the timing of transmission so that no data collisions occur on the satellite link, and the second is to relay data as it is received from a terminal without delay to the satellite and retransmit a copy of the previous data if it encounters collision. However, this network employs an end-to-end protocol in which an acknowledgement is returned from the destination terminal over the satellite link in response to each transmission of a message packet, thus imposing limitations on high speed data communication.

SUMMARY OF THE INVENTION

It is therefore an object of the present invention to provide a multipoint satellite data communication system which allows high speed data communication.

The data communication system of the present invention has a plurality of data terminals and a plurality of earth stations serving the data terminals respectively, and a communications satellite linking the earth stations. A source earth station establishes a plurality of first logical channels to a source data terminal and each of a plurality of destination earth stations establishes a second logical channel to a destination data terminal, the first logical channels being equal in number to the number of the second terminal logical connections. Satellite logical links are established respectively between the first logical channels and the second logical channels via the communications satellite. Each of the earth stations performs flow control on each of the logical channels on a per message unit basis and performs flow control on each of the logical links on the basis of a per predetermined number of consecutive message units.

Owing to the per-plural units flow control procedure on the satellite logical links, high satellite channel throughput can be achieved while utilizing the broadcast and multiple access nature of the communications satellite.

BRIEF DESCRIPTION OF THE DRAWINGS

The present invention will be described in further detail with reference to the accompanying drawings, in which.

DETAILED DESCRIPTION

STRUCTURES AND FUNCTIONS

Figure 1:
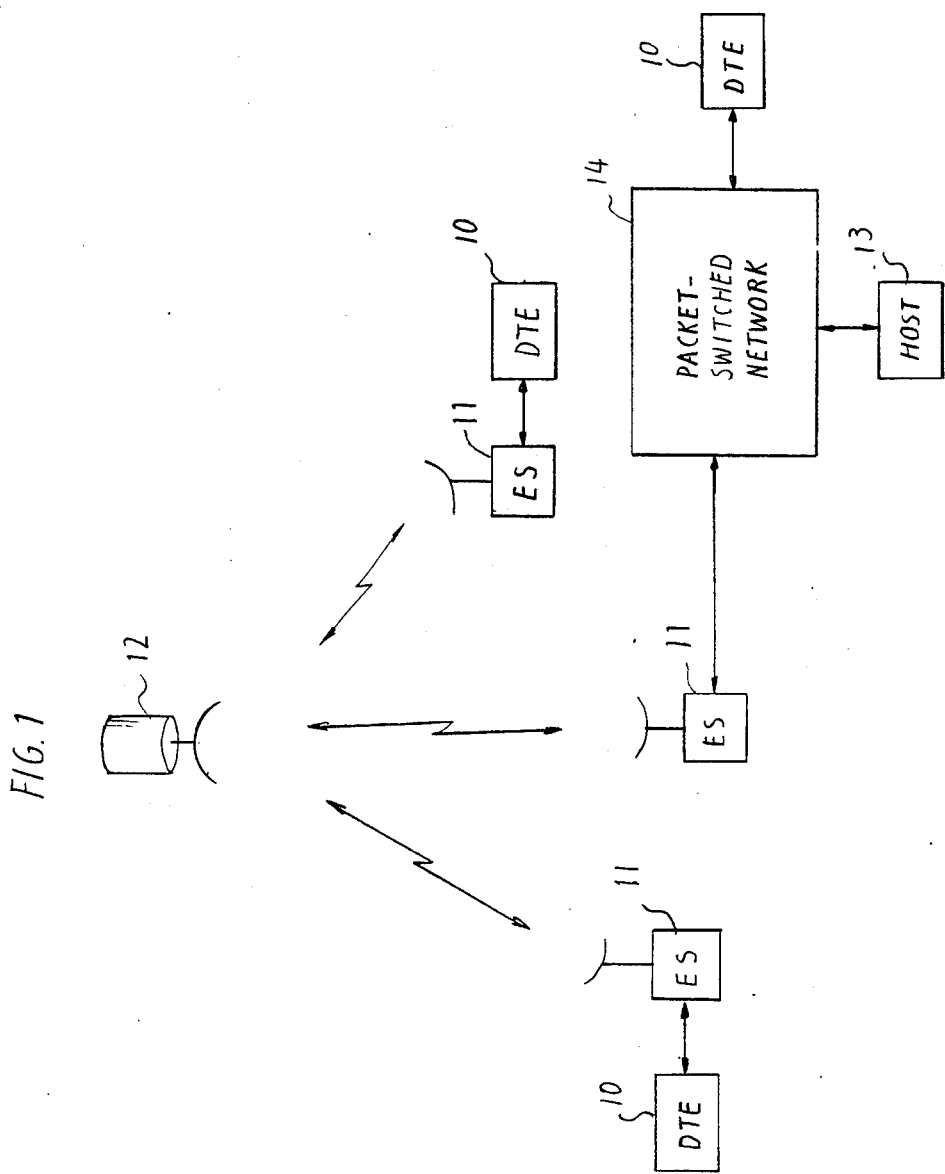
FIG. 1 is a block diagram of a data communication system embodying the invention.

Referring now to FIG. 1, there is shown a multipoint packet-switched satellite communications network embodying the present invention. The satellite communications network comprises a plurality of earth stations 11 each serving one or more data terminal equipment 10 and a satellite 12. Data terminal equipment 10 and a host computer 13 may be coupled through a packet-switched network 14 to a serving earth station.

Figure 2:
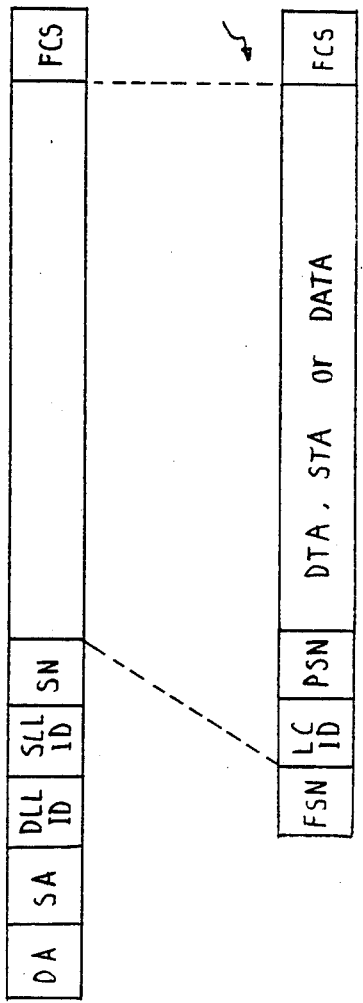
FIG. 2 is an illustration of data formats for frames for terrestrial communication and packets for satellite communication.

Each data terminal equipment 10 transmits a message having a frame format shown at 50 in FIG. 2. This message contains a call request frame which is sent from a source terminal to the serving earth station to establish a connection to a destination data terminal, a call response frame which is returned from the destination terminal in response to the call request frame, and a series of data frames sent from the source terminal on receipt of the call response frame and an acknowledgement frame that is sent from a receiving terminal when it has correctly received a data frame. At the end of a call, a call clearing frame is sent from the source terminal to clear the virtual circuit. The call control frames and data frames have a frame sequence number (FSN), a logical channel identifier (LCID) and a packet sequence number (PSN). Following the packet sequence number, the call control frames include a destination terminal address (DTA) and source terminal address (STA) and the data frame contains a data field into which a message is written. The address information and data field are followed by a frame check sequence (FCS). The data format shown at 51 is a packet which contains a packet header including a destination earth station address (DA), a source earth station address (SA), a destination logical link identifier (DLLID), a source logical link identifier (SLLID) and a sequence number (SN). This packet header is followed by the portion of the frame 50 which excludes the frame header FSN.

Figure 3:
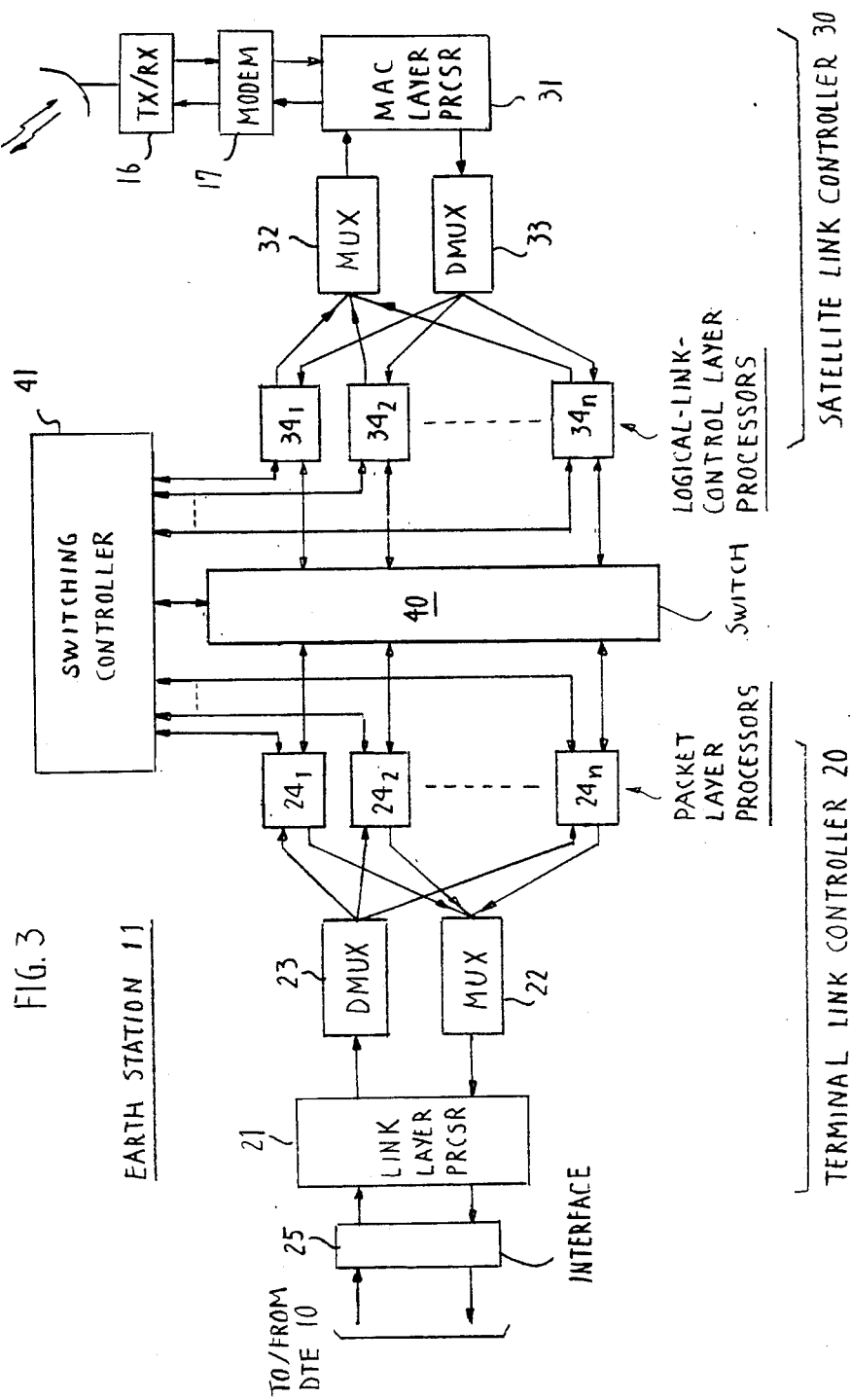
FIG. 3 is a block diagram of each earth station.

FIG. 3 shows details of each earth station 11. Earth station 11 generally comprises a terminal link controller 20 which is constructed in accordance with the CCITT (International Telegraph and Telephone Consultative Committee) Recommendation X.25 interface and a satellite link controller 30 which is constructed in accordance with the IEEE (Institute of Electrical and Electronics Engineers) 802 Committee Standards for local area networks. Terminal link controller 20 includes a link layer processor 21, a multiplexer 22, a demultiplexer 23 and a plurality of packet layer processors $24_1$ $24_n$ which establish logical channels to the associated data terminal equipment 10 over a single physical circuit. Link layer processor 21 is connected to the data terminal equipment 10 through an interface unit 25 to perform a link layer protocol on data frames sent to and from data terminal equipment 10. Link layer processor 21 is connected to demultiplexer 23 where outgoing frames are individually separated according to their destinations for coupling to packet layer processors $24_1$ to $24_n$. Multiplexer 22 provides multiplexing of incoming frames from packet layer processors 24 into a data stream and applies it to the link layer processor 21. Each packet layer processor 24 performs a packet layer protocol on outgoing data frames for coupling through a switch 40 to the satellite link controller 30 and performs a packet layer protocol on incoming packets from satellite link controller 30 by updating their header information for coupling to the multiplexer 22.

Satellite link controller 30 includes a media-access-control (MAC) layer processor 31 which is connected through modem 17 to a low-noise amplifier receiver/high power amplifier transmitter 16, a multiplexer 32, demultiplexer 33 and a plurality of logical-link-control (LLC) layer processor $34_1$ through $34_n$ which establish two-way logical links to distant earth stations through the satellite 12. Each LLC layer processor 34 performs an LLC layer protocol according to the IEEE standard 802 on outgoing packets by updating their header information and store-and-forward transmission of the packets for coupling through multiplexer 32 to the MAC layer processor 31 and performs an LLC layer prototol on incoming packets from MAC layer processor 31 through demultiplexer 33 for coupling to the terminal link layer 20.

When establishing a logical link to a destination earth station from a source earth station, one of the packet layer processors 24 of the source station handling a call request frame transfers it to the switching controller 41 to permit it to select one of the LLC layer processors 34 having a logical link to the destination earth station and to control the switch 40 to establish a connection between that packet layer processor 24 and the selected LLC layer processor 34. MAC layer processor 31 performs a media-access-control layer protocol on outgoing packets multiplexed by multiplexer 32 and examines incoming packets from satellite 12 to pass ones addressed to the own earth station and checks for error. A series of incoming packets from multipoint destinations are distributed by demultiplexer 33 according to their destination logical link identifiers to associated LLC layer processors 34.

When establishing an incoming logical channel to the DTE 10 on receipt of an incoming call request packet, switching controller 41 receives the call request packet from the LLC layer processor 34 handling it and selects one of the packet layer processors 24, controls the switch 40 to establish a connection between the selected packet layer processor 24 and the LLC layer processor 34 handling the call request packet and supplies the necessary information to the selected packet layer processor 24 to convert the packet according to the X.25 protocol so that it contains a logical channel identifier assigned to the selected packet layer processor 24.

When the incoming logical channel is established, a virtual circuit extends from a source data terminal to a destination data terminal. Terminal link controller 20 and satellite link controller 30 in the source and destination earth stations thereafter cooperate with the switching controller 41 to convert data frames sent from the terminal link into data packets for transmission to the satellite link and convert data packets from the satellite link into data frames for transmission to the terminal link.

Figure 4:
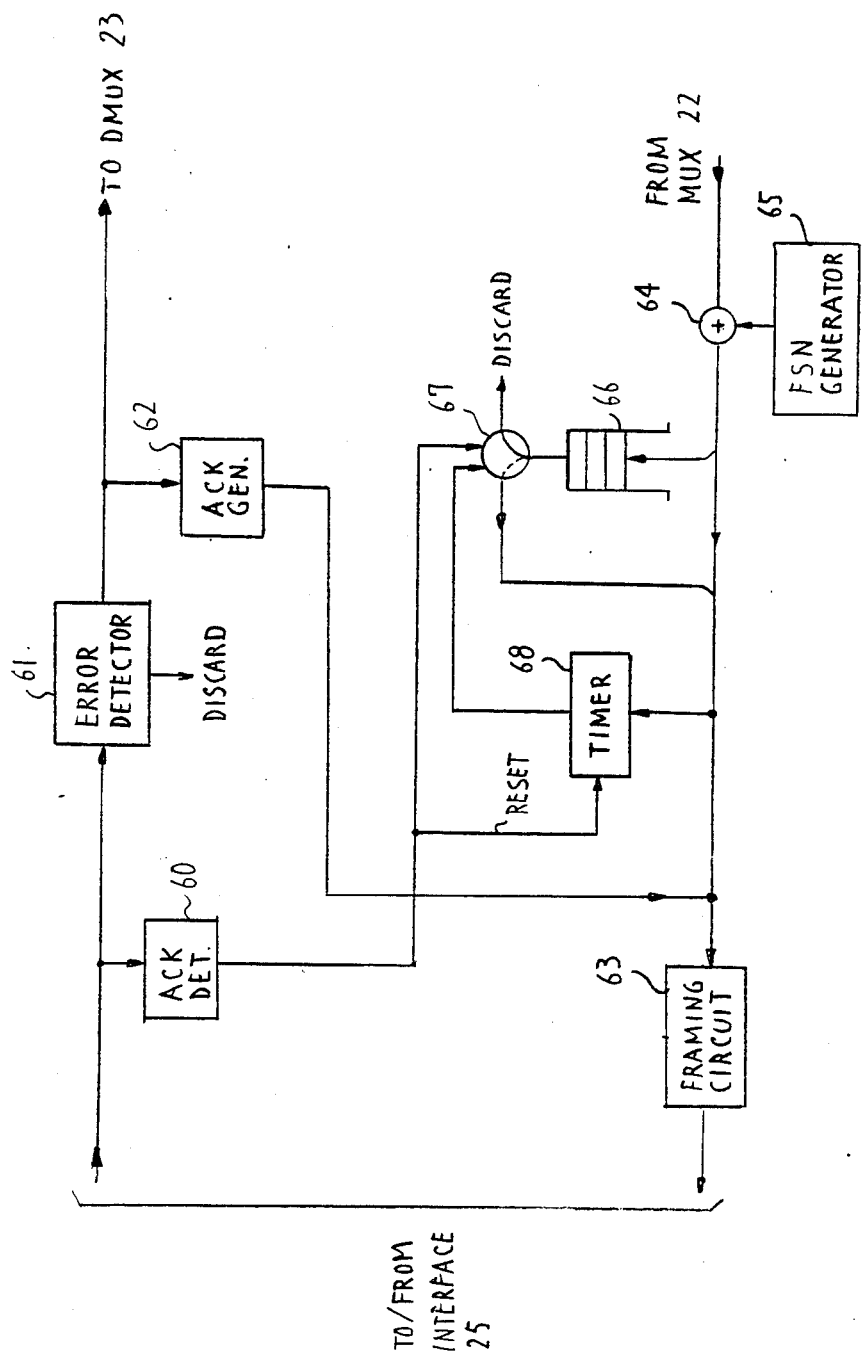
FIG. 4 is a block diagram of the link layer processor of FIG. 3.
Figure 5:
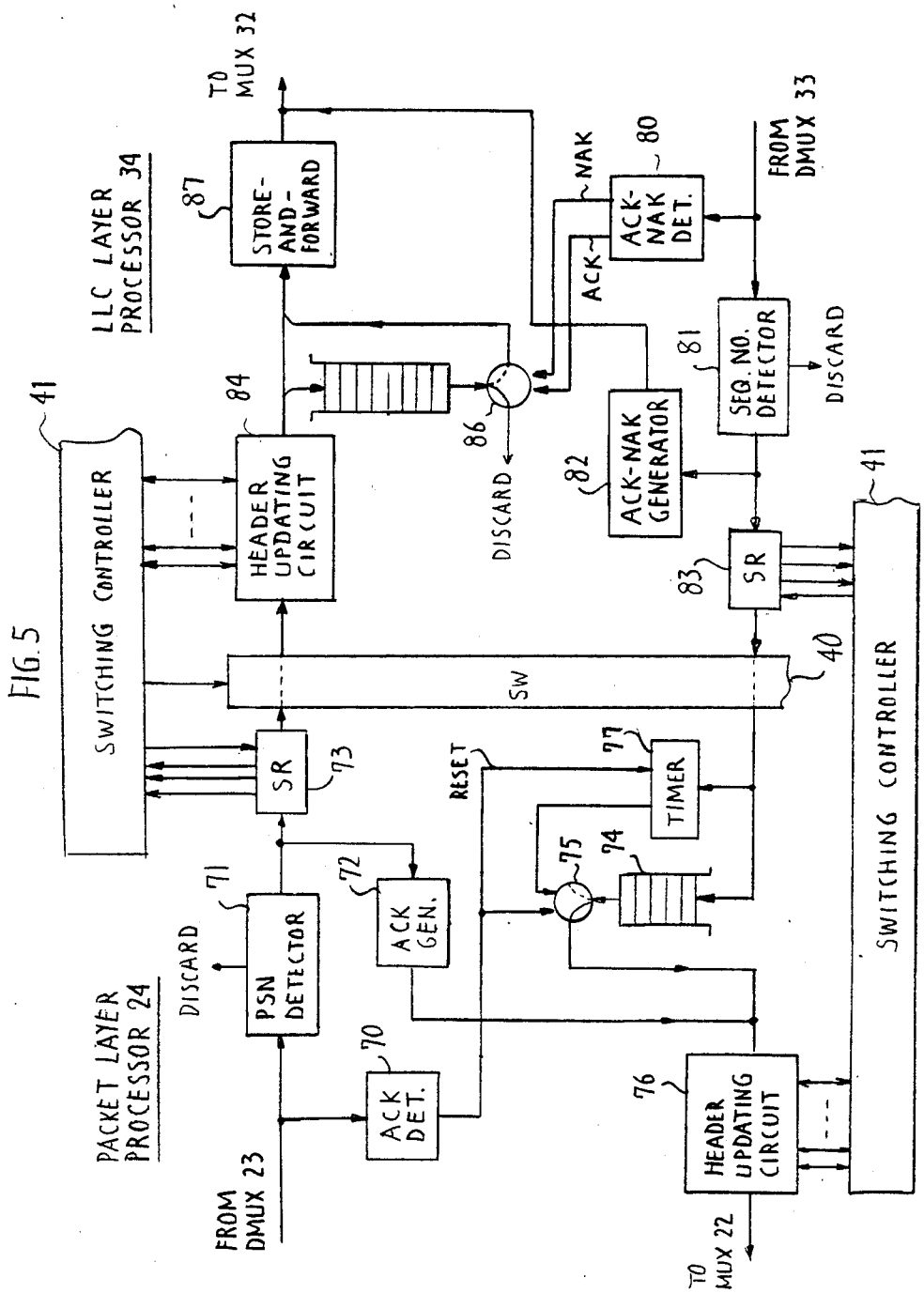
FIG. 5 is a block diagram of the packet layer processor, logical-link-control layer processor and switching controller of FIG. 3.

For a full understanding of the present invention, reference is made to FIGS. 4 and 5. In FIG. 4, link layer processor 21 includes an acknowledgement detector 60 which detects acknowledgement frames returning from the data terminal 10 when a frame sent from the link layer processor 21 has been correctly received. A signal indicating this fact is applied to a flow controller 67. An error detector 61 examines the starting and closing flags of each frame, checks for bit errors using frame check sequence and checks for out of frame sequence using frame sequence number. If there is a frame in error, it is discarded. If there is none, the received frame is applied to the demultiplexer 23 and to an acknowlegement (ACK) packet generator 62 which returns an acknowledgement in response to receipt of a correct data frame.

The output of multiplexer 22, on the other hand, is applied to an adder 64 which allows insertion of a frame sequence number generated by a frame sequence number generator 65 into incoming packets to organize frames. The output of adder 64 is supplied to the framing circuit 63, a retransmit buffer 66 and a timer 68. Timer 68 provides a timeout action by detecting the elapse of time from the time it receives an incoming frame from multiplexer 22 and generating an output when a prescribed timeout interval expires. This occurs when an acknowledgement is not returned due to errors or when it is returned but corrupted during transmission. The output of retransmit buffer 66 is connected to the flow controller 67 which responds to the output of acknowledgement detector 60 by discarding an outstanding incoming frame awaiting acknowledgement in the buffer 66 and further responds to the output of timer 68 by retrieving the outstanding incoming frame from the buffer 66 into the framing circuit 63 at the end of a timeout interval when an acknowledgement is not returned from data terminal. Framing circuit 63 generates flag bits and error detecting redundant bits and appends these bits to the incoming bit stream supplied from the adder 64 and ACK packet generator 62 for application to the interface unit 25.

In FIG. 5, each of the packet layer processors 24 includes an acknowledgement (ACK) detector 70 connected to an output terminal of the demultiplexer 23, a packet sequence number detector 71 connected to a data output terminal of the ACK detector 70 and an acknowledgement packet generator 72. Packet sequence number detector 71 checks for out of packet sequence. If correctly received, outgoing packets are applied to a shift register 73 which transfers them to the switching controller 41 to permit it to select a desired one of the LLC layer processors 34 according to the destination terminal address contained in the transferred data. If the outgoing packet is a call request packet, switching controller 41 proceeds to control the switch 40 to establish a connection between the packet layer processor 24 handing the outgoing packet and the selected LLC layer processor 34 and directs the shift register 73 to pass its contents through the switch 40 to the selected LLC layer processor 34, while registering the status of the connected processors 24 and 34 into memory. If the switching controller 41 receives a call clearing packet, it examines its address information and clears the established connection according to the registered status of the memory and clears the memory. ACK generator 72 returns an acknowledgement to multiplexer 22 whenever a correct packet has been received. Processor 24 further includes a buffer 74 having an input connected to a terminal of switch 40 to store a series of consecutive packets from the selected LLC layer processor 34 and an output connected to a flow controller 75. Flow controller 75 sends the earliest of the consecutive packets from the buffer 74 to a header updating circuit 76 and responds to the output of ACK detector 70 to send a subsequent packet and repeats this process until all the packets stored in the buffer 75 have been sent. If no acknowledgement is returned with respect to a given packet, a timer 77 supplies an output to the flow controller 75 at the end of a timeout period to cause it to send a copy of the given packet to the header updating circuit 76. Header updating circuit 76 is connected to the switching controller 41 to update the header information of the packet from the output of flow controller 75 by writing a logical channel identifier (LCID) and a packet sequence number (PSN) into the packet header. The output of header updating circuit 76 is combined with the output of ACK packet generator 72 for coupling to the multiplexer 24.

The LLC layer processor 34 comprises an ACK-/NAK detector 80, a sequence number detector 81 and an ACK/NAK packet generator 82 connected to the output of detector 81. ACK/NAK detector 80 checks for the presence of a positive acknowledgement and a negative acknowledgement returning from the distant earth station in response to each transmission of a packet. ACK/NAK generator 82 generates a positive acknowledgement packet if error is not detected in an incoming packet and a negative acknowledgement if an error is detected therein. Sequence number detector 81 examines the SN field of incoming packets supplied from the demultiplexer 33 to check for out of sequence. If they are in correct sequence, the incoming packets are applied to a shift register 83 which transfers them to the switching controller 41 to permit it to select a desired one of the packet layer processors 24 according to the destination terminal address contained in the transferred data. If the incoming packet is a call request packet, switching controller 41 proceeds to control the switch 40 to establish a connection between the LLC layer processor 34 handing the incoming packet and the selected packet layer processor 24 and directs the shift register 83 to pass its contents through the switch 40 to the header updating circuit 76 of the selected packet layer processor 24, while registering the status of the connected processors 24 and 34 into memory. If it receives a call clearing incoming packet, the switching controller 41 examines its address information and clears the established connection using the stored relationship between the associated processors 24 and 34 in the memory.

Each LLC layer processor 34 further includes a header updating circuit 84 and a store-and-forward circuit 88 which are connected in series from switch 40 to multiplexer 32. Header updating circuit 84 receives outgoing packets from the shift register 73 of the associated packet layer processor 24 and cooperates with the switching controller 41 to permit it to rewrite the header of each outgoing packet for protocol conversion so that it contains source and destination earth station addresses (SA, DA), source logical channel identifier (SLLC) and a sequence number (SN). This packet is delivered to store-and-forward 87 on the one hand and to a retransmit buffer 85 on the other. Store-and-forward 87 stores a predetermined number of outgoing packets and transmits them consecutively and awaits acknowldgements to be consecutively returned from the ACK/NAK generator 82 of the distant earth station. Retransmit buffer 85 has a storage capacity much larger than that of the retransmit buffer 74. If a negative acknowledgement is returned with respect to one of the consecutive transmitted packets, the ACK/NAK detector 80 causes a flow control circuit 86 to read a copy of this packet out of the buffer 85 into the store-and-forward circuit 87 for retransmission and if a positive acknowledgement is returned with respect to that packet, a copy of this packet is discarded. Because of the consecutive transmission of multiple packets without awaiting acknowledgement for each packet prior to transmission of a subsequent packet, high throughput utilization of a multipoint satellite data communication system is achieved.

Switching controller 41 includes a memory for storing paired relationships between packet layer processors 24 and LLC layer processors which are to be interconnected during data transer phase for multipoint communication.

Figure 6:
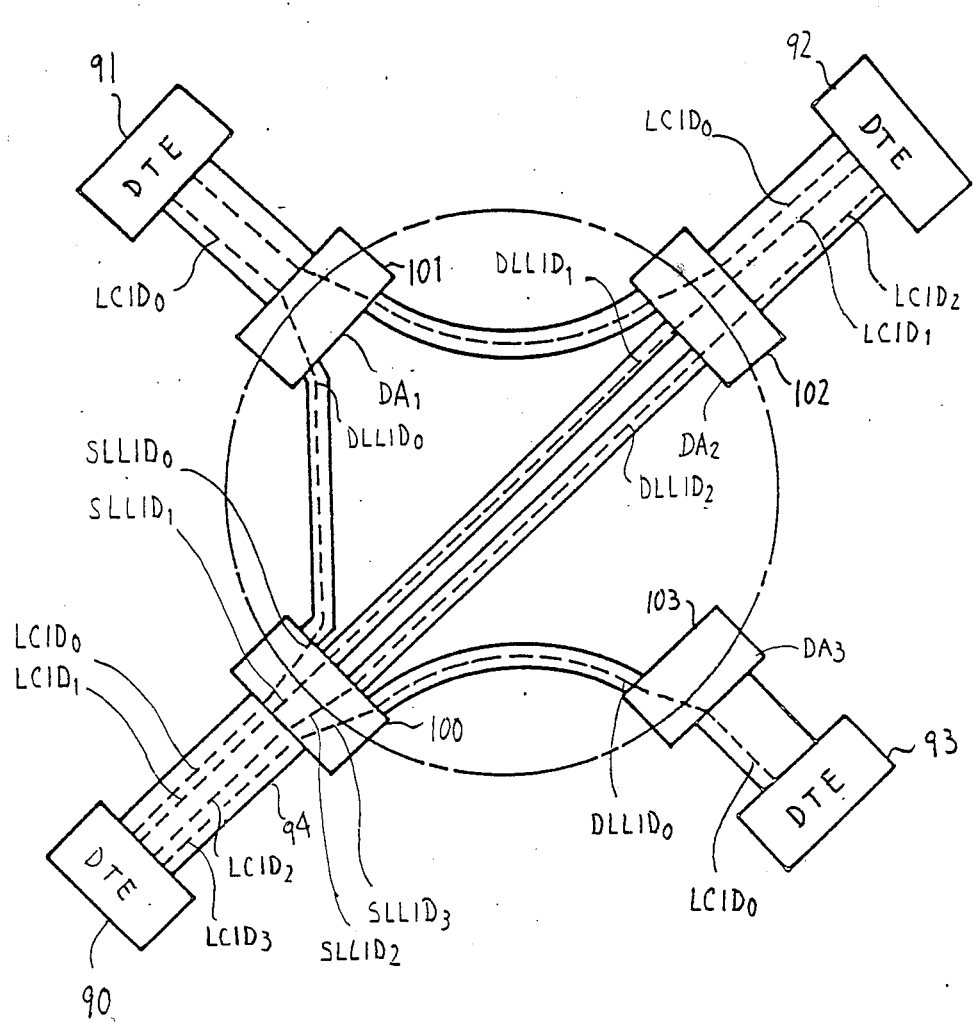
FIG. 6 is a schematic illustration useful for describing the operation of the invention.

FIG. 6 shows an example of multipoint communication in which four full-duplex virtual circuits are established between a source terminal 90 on the one hand and destination terminals 91, 92 and 93 on the other and a full-duplex virtual circuit established between terminals 91 and 92. Between terminal 90 and an adjacent earth station 100 which is identified by a source address SA, four logical channels identified by logical channel identifiers $LCID_0$ through $LCID_3$ are established over a single physical link 94. Logical channels $LCID_0$ through $LCID_3$ involve four packet layer processors 24 and four LLC layer processors 34 and connect to satellite logical links identified by source logical link identifiers $SLLID_0$ through $SLLID_3$, respectively, for example. The logical link which is identified by source logical link identifier $SLLID_0$ at source earth station 100 is identified by a destination logical link identifier $DLLID_0$ at destination earth station 101 (which is identified by a destination identifier $DA_1$) and connects to destination terminal 91 through a logical channel identified by a logical channel identifier $LCID_0$ which is unique to the destination earth station 101. The logical links identified by source logical link identifiers $SLLID_1$ and $SLLID_2$ at source earth station 100 are identified by destination logical link identifiers $DLLID_1$ and $DLLID_2$ at the destination earth station 102 (which is identified by destination address $DA_2$)

and connect to logical channels $LCID_1$ and $LCID_2$. Logical link $SLLID_3$ at the source station 100 is identified by identifier $DLLID_0$ at the destination earth station 103 (which is identified by identifier $DA_3$) and connects through logical channel $LCID_0$ to terminal 93.

OPERATION

CALL ESTABLISHMENT PHASE

The operation of the whole system of the present invention will now be described. When establishing a connection from data terminal 90, it sends a call request frame with a logical channel identifier and a destination terminal addresss within it to the interface unit 25 of the serving earth station 100. This call request frame is passed through link-layer processor 21 to demultiplexer 23 which examines the logical channel identifier and passes it to a packet layer processor 24i identified by the logical channel identifier. The destination terminal address of the call request frame is examined by the switching controller 41 and a switched connection is established between the packet layer processor 24i and an LLC layer processor 34i which is associated with a destination earth station serving the destination data terminal and is identified by a source logical link identifier. The outgoing call request frame is converted into satellite packet format with a packet header containing source and destination earth station addresses and the source logical link identifier appended thereto. Switching controller 41 stores the one-to-one relationship between processors 24i and 34i to permit subsequent outgoing messages to be transferred from processor 24i to processor 34i and permit subsequent incoming messages to be transferred from processor 34i to processor 24i by examining their header information. This outgoing call request packet is transmitted through multiplexer 32, MAC layer processor 31, modem 17 and transmit/receive unit 16 to a destination earth station.

At the destination earth station, the received packet is applied to MAC layer procesor 31 as an incoming call request packet. After examining the destination earth station address (DA) and checking for error, the MAC layer processor 31 passes the incoming call request packet to demultiplexer 33. Demultiplexer 33 examines the destination logical link identifer field of the incoming packet and, if it contains no information (which is the case for incoming call request packets), proceeds to select an idle LLC layer processor 34j and passes the incoming packet through the selected LLC layer processor 34j to switching controller 41. Switching controller 41 stores the destination logical link identifier associated with the selected LLC layer processor 34j, selects a packet layer processor 24j according to the destination terminal address and stores the logical channel identifier associated with the selected packet layer processor 24j. Controller 41 instructs the switch 40 to establish a connection between processors 34j and 24j. If the incoming packet contains a destination logical link identifier (which is the case for incoming data packets), demultiplexer 33 selects the LLC layer processor according to that destination logical link identifier. The incoming call request frame is converted into a frame by the packet layer processor 24j with a logical channel identifier identifying the selected packet layer processor 24j contained in it and passed through multiplexer 22 and link layer processor 21 to the destination data terminal. A call response frame is then returned from the destination data terminal to the serving earth station. This call response frame contains the source and destination terminal addresses and the logical channel identifier of the packet layer processor 24j. The logical channel identifier is examined by demultiplexer 23 and passes the outgoing call response frame through packet layer processor 24j and switch 40 to LLC layer processor 34j which cooperates with switching controller 41 to convert it into a call response packet so that it contains all the header information necessary for subsequent messages to be exchanged between source and destination terminals involving processors 24i and 34i at the source earth station and processors 34j and 24j at the destination earth station.

On receipt of the incoming call response packet, the MAC layer processor 31 of the source earth station 90 examines its source earth station address (SA) before passing it to demultiplexer 33. Demultiplexer 33 examines the source logical link identifier and passes the incoming call response packet through LLC layer processor 34i and switch 40 to packet layer processor 24i where it is converted to a call response frame and passed through multiplexer 22 and link layer processor 21 to the source data terminal 90. As a result, a two-way virtual circuit is established between source and destination terminals to allow subsequent messages to be exchanged between the two terminals. The above process is repeated to establish a plurality of virtual circuits from the source terminal 90 to a plurality of destination terminals.

DATA TRANSFER PHASE

When a data frame is sent from source terminal 90 to earth station 100, the link layer processor 21 checks it for bit error and out-of-frame sequence error and returns a link level acknowledgement in response to each data frame and passes it to demultiplexer 23 which hands it to packet layer processor 24i. Processor 24i provides packet sequence number check on the outgoing data frame and returns a packet level acknowledgement to the source terminal 90 and passes the data frame through switch 40 to LLC layer processor 34i. If error is detected in link layer processor 21 or packet layer processor 24i, no acknowledgement is returned and data terminal 90 retransmits a copy of the corrupted data at the end of a timeout interval. In the LLC layer processor 34i, the outgoing data frame is converted to a packet by updating its header information with the necessary information which has been stored in the switching controller 41 in association with the outgoing call request frame and incoming call response packet. A plurality of updated outgoing data packets are consecutively sent from the LLC layer processor 34i through the established logical link to the destination earth station to await acknowledgements therefrom.

At the destination earth station, the MAC layer processor 31 examines the destination earth station addresses of the received data packets and checks for bit error and passes them to demultiplexer 33 where they are diverted to LLC layer processor 34j according to their destination logical link identifiers. LLC layer processor 34j examines the sequence number (SN) field of these packets for out-of-sequence check and passes them through switch 40 to packet layer processor 24j, while returning a series of positive acknowledgements to the source earth station if no out-of-sequence error is detected. Packet layer processor 24j stores the consecutive incoming packets into the retransmit buffer 74. Flow controller 75 sends the earliest of these packets to the header updating circuit 76 where it updates its header information with the logical channel identifier stored in the switching controller 41 to form a data frame and sends it through multiplexer 22 to the link layer processor 21 where a frame sequence number is added to it for transmission to the destination data terminal. If the latter correctly receives the incoming data frame, it returns a link-level acknowledgement and then a packet-level acknowledgement, these acknowledgements being respectively processed by link layer processor 21 and packet layer processor 24j. Flow controller 75 of processor 24j responds to the packet-level acknowledgement to read a subsequent data packet out of the buffer 74 into the header updating circuit 76 for format conversion and transmission through link layer processor 21 to the destination terminal.

This flow control process is repeated until all the data packets stored in buffer 74 are transmitted and the buffer 74 is cleared. If no packet-level acknowledgement is received in respect of a given packet within the timeout interval of timer 72, flow controller 75 reads a copy of the given packet out of buffer 74 for retransmission.

Messages sent from the destination data terminals are processed by the same processors as used for processing the messages sent from the source data terminal.

It is seen therefore that when acknowledgements are being returned on a per frame basis from a data terminal upon receipt of incoming packets over a given logical link or when transmitting outgoing packets over the given logical link, a series of consecutive data packets can be sent or received over another logical link. Thus, the satellite channels can be efficiently shared among the multiple logical links. In this manner, a multipoint data communication system with a high satellite channel throughput utilization can be realized.

CALL CLEARING PHASE

Upon the termination of a call, a call clearing frame is sent from the source data terminal 90. As it propagates through the established virtual circuit, the header information associated with it are cleared in the switching controllers 41 at source and destination earth stations.

The foregoing description shows only one preferred embodiment of the present invention. Various modifications are apparent to those skilled in the art without departing from the scope of the present invention which is only limited by the appended claims.

What is claimed is:

1. A method for communication between a source data terminal and a plularity of destination data terminals via a satellite communications system including a source earth station serving said source data terminal, a plurality of destination earth stations serving said destination data terminals, and a communications satellite linking said source earth station and said destination earth stations, the method comprising:
   transmitting call requests from said source data terminal to said source earth station, said call requests containing addresses of said destination data terminals;
   establishing in response to said call requests from said source data terminal a plurality of first logical channels from said source earth station to said source data terminal, a plurality of logical links from said first logical channels at said source earth station to a plurality of said destination earth stations via said communications satellite, and a plurality of second logical channels from said logical links at said destination earth stations to said destination data terminals;
   providing flow control on each of said first logical channels on a per message unit basis;
   providing flow control on each of said logical links on the basis of a plurality of consecutive message units; and
   providing flow control on each of said second logical channels on a per message unit basis.

2. A data communication system having a plurality of data terminals and a plurality of earth stations serving said data terminals respectively, and a communications satellite linking said earth stations, each of said data terminals sending a call request containing a destination terminal address therein when establishing a virtual circuit thereto, sending message units when the virtual circuit is established and returning an acknowledgement in response to receipt of a message unit, each of said earth stations comprising:
   first means for establishing a plurality of first logical channels from a source earth station to a source data terminal in response to receipt of a plurality of call requests therefrom and establishing a plurality of second logical channels from one or more destination earth stations to one or more destination data terminals in response to receipt of said call requests from said service data terminal via said satellite, said first means including means for returning an acknowledgement through said first logical channels in response to receipt of a message unit therethrough and returning an acknowledgement through said second logical channels in response to receipt of a message unit therethrough;
   second means for establishing a plurality of logical links between said source earth station and said destination earth stations via said satellite in response to said call requests from said source data terminal, said second means including store-and-forward means for storing and forwarding a predetermined number of consecutive ones of message units through said logical links to said destination earth stations, awaiting acknowledgements from said destination earth stations to repeat the forwarding of subsequent consecutive message units, and returning acknowledgements through said logical links to said source earth stations respectively in response to said consecutive message units; and
   third means responsive to said call requests for respectively connecting said first logical channels to first ends of said logical links and respectively connecting said second logical channels to opposite ends of said logical links.

3. A data communication system as claimed in claim 2, wherein said first means comprises:
   first layer processor means for processing a lower layer of source-to-destination message units according to a first protocol to produce a first output signal and processing a lower layer protocol of destination-to-source message units according to said first protocol for transmission to said source terminal;
   means for demultiplexing said first output signal into individual message units;
   a plurality of second layer processor means for respectively processing a higher layer of said demultiplexed messsage units according to said first protocol to produce second output signals and respectively processing a higher layer of destination-to-source message units according to said first protocol; and means for multiplexing the last-mentioned message units and applying them to said first layer processor means, said second means comprising:

a plurality of third layer processor means for processing a higher layer of said second output signals from said second layer processor means according to a second protocol to produce third output signals and processing a higher layer of message units be supplied to said second layer processor means according to said second protocol, each of said third layer processor means including said store-and-forward means;

means for multiplexing said third output signals; and fourth layer processor means for processing a lower layer of said multiplexed third output signals according to said second protocol to produce a fourth output signal for transmission to said logical links and processing the lower layer of message units received from said logical links according to said second protocol, said third means establishing switched connections between said second layer processor means and said third layer processor means.

4. A data communication system as claimed in claim 3, wherein said first and second protocols are CCITT (International Telegraph and Telephone Consultative Committee) Recommendation X.25 and IEEE (Institute of Electrical and Electronics Engineers) Standard 802, respectively, and wherein said lower and higher layers of said first protocol correspond to the link layer and packet layer of the CCITT Recommendation X.25, respectively, and said lower and higher layers of said second protocol correspond to the media-access-control layer and the logical-link-control layer of IEEE standard 802, respectively.

5. A data communication systm as claimed in claim 3, wherein said third means comprises:

switch means for establishing switched connections between said second and third layer processor means; and control means for cooperating with each of said second layer processor means and each of said third layer processor means and controlling said switch means to establish said switched connections.

6. A data communication system as claimed in claim 3, wherein said third layer processor means include means for inserting a destination data terminal address into said higher layer of said second output signals from said second layer processor means and wherein said fourth layer processor means includes means for examining said destination data terminal address contained in a message unit received from a source earth station.

* * * * *